United States Patent
Shi

(10) Patent No.: US 11,892,596 B2
(45) Date of Patent: Feb. 6, 2024

(54) CAMERA OPTICAL LENS

(71) Applicant: AAC Optics (Changzhou) Co., Ltd., Changzhou (CN)

(72) Inventor: Rongbao Shi, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 574 days.

(21) Appl. No.: 17/129,926

(22) Filed: Dec. 22, 2020

(65) Prior Publication Data

US 2022/0011545 A1    Jan. 13, 2022

(30) Foreign Application Priority Data

Jul. 13, 2020    (CN) .......................... 202010666139.5

(51) Int. Cl.
*G02B 13/00*    (2006.01)
*G02B 9/64*    (2006.01)

(52) U.S. Cl.
CPC ........... *G02B 13/0045* (2013.01); *G02B 9/64* (2013.01)

(58) Field of Classification Search
CPC ...... G02B 13/0045; G02B 13/18; G02B 9/64; G02B 15/1461
See application file for complete search history.

(56) References Cited

U.S. PATENT DOCUMENTS

| | | | | |
|---|---|---|---|---|
| 9,703,078 | B1 * | 7/2017 | Teraoka | G02B 13/0045 |
| 2016/0124191 | A1 * | 5/2016 | Hashimoto | G02B 13/0045 359/708 |
| 2016/0131874 | A1 * | 5/2016 | Tang | G02B 9/64 359/708 |
| 2019/0121083 | A1 * | 4/2019 | Bian | G02B 1/041 |

(Continued)

FOREIGN PATENT DOCUMENTS

| | | | | |
|---|---|---|---|---|
| CN | 108132512 A | * | 6/2018 | ......... G02B 13/0045 |
| CN | 109283655 A | * | 1/2019 | ......... G02B 13/0045 |

(Continued)

OTHER PUBLICATIONS

Galstian, Tigran V. "Future Trends: Panoramic Mini-Cameras." Smart Mini-Cameras. United States: Taylor & Francis Group, 2013. Web. (Year: 2013).*

(Continued)

*Primary Examiner* — Nicholas R. Pasko
*Assistant Examiner* — Samanvitha Sridhar
(74) *Attorney, Agent, or Firm* — W&G Law Group

(57) ABSTRACT

Provided is a camera optical lens, which includes, from an object side to an image side, first to seventh lenses. The camera optical lens satisfies following conditions: $0.50 \leq f1/f \leq 0.80$; $1.50 \leq f6/f7 \leq 5.00$; and $1.20 \leq d4/d5 \leq 2.00$, where f denotes a focal length of the camera optical lens, f1 denotes a focal length of the first lens, f6 denotes a focal length of the sixth lens, f7 denotes a focal length of the seventh lens, d4 denotes an on-axis distance from an image side surface (Continued)

of the second lens to an object side surface of the third lens, and d5 denotes an on-axis thickness of the third lens. The camera optical lens according to the present disclosure can achieve high optical performance while satisfying design requirements for ultra-thin, long-focal-length lenses having large apertures.

9 Claims, 9 Drawing Sheets

(56) References Cited

U.S. PATENT DOCUMENTS

| | | | | |
|---|---|---|---|---|
| 2020/0064595 A1* | 2/2020 | Huang | ............... | G02B 13/0045 |
| 2020/0241243 A1* | 7/2020 | Hirano | ..................... | G02B 9/64 |
| 2021/0149166 A1* | 5/2021 | Zhang | ..................... | G02B 13/18 |
| 2021/0231925 A1* | 7/2021 | You | ..................... | G02B 13/0045 |
| 2021/0278634 A1* | 9/2021 | Hu | ..................... | G02B 13/0045 |
| 2022/0206271 A1* | 6/2022 | Teranishi | ........... | G02B 27/0025 |

FOREIGN PATENT DOCUMENTS

| | | | | | |
|---|---|---|---|---|---|
| CN | 110673309 A | * | 1/2020 | ......... | G02B 13/0045 |
| JP | H0358088 B2 | * | 9/1991 | ..... | G02B 15/143103 |
| JP | H03267909 A | * | 11/1991 | ......... | G02B 15/1421 |
| TW | 202011066 A | * | 3/2020 | .......... | G02B 13/0015 |

OTHER PUBLICATIONS

Aggarwal, Roshan L, and Kambiz Alavi. "Lenses." Introduction to Optical Components. 1st ed. United Kingdom: CRC Press, 2018. 1-17. Web. (Year: 2018).*

* cited by examiner

CAMERA OPTICAL LENS

TECHNICAL FIELD

The present disclosure relates to the field of optical lens, and more particularly, to a camera optical lens suitable for handheld terminal devices, such as smart phones or digital cameras, and camera devices, such as monitors or PC lenses.

BACKGROUND

With the emergence of smart phones in recent years, the demand for miniature camera optical lens is increasingly higher, but in general the photosensitive devices of camera optical lens are nothing more than Charge Coupled Devices (CCDs) or Complementary Metal-Oxide Semiconductor Sensors (CMOS sensors). As the progress of the semiconductor manufacturing technology makes the pixel size of the photosensitive devices become smaller, plus the current development trend of electronic products towards better functions and thinner and smaller dimensions, miniature camera optical lenses with good imaging quality have become a mainstream in the market.

In order to obtain better imaging quality, the conventional lens equipped in mobile phone cameras adopts a three-piece or four-piece lens structure, or even a five-piece or six-piece structure. However, with the development of technology and the increasingly diverse demands of users, the pixel area of photosensitive devices is becoming smaller and the requirement of the system on the imaging quality is increasingly higher, a seven-piece lens structure gradually emerges in lens designs. Although the common seven-piece lens has good optical performance, its refractive power, lens spacing and lens shape settings still have some irrationality, such that the lens structure cannot achieve high optical performance while satisfying design requirements for ultra-thin, long-focal-length lenses having large apertures.

SUMMARY

In view of the problems, the present disclosure provides a camera optical lens, which can achieve high optical performance while satisfying design requirements for ultra-thin, long-focal-length lenses having large apertures.

In an embodiment, the present disclosure provides a camera optical lens. The camera optical lens includes, from an object side to an image side, a first lens having a positive refractive power, a second lens having a negative refractive power, a third lens, a fourth lens having a positive refractive power, a fifth lens having a positive refractive power, a sixth lens having a negative refractive power, and a seventh lens having a negative refractive power. The camera optical lens satisfies following conditions: $0.50 \leq f1/f \leq 0.80$, $1.50 \leq f6/f7 \leq 5.00$, and $1.20 \leq d4/d5 \leq 2.00$, where f denotes a focal length of the camera optical lens, f1 denotes a focal length of the first lens, f6 denotes a focal length of the sixth lens, f7 denotes a focal length of the seventh lens, d4 denotes an on-axis distance from an image side surface of the second lens to an object side surface of the third lens, and d5 denotes an on-axis thickness of the third lens.

As an improvement, the camera optical lens further satisfies $1.50 \leq R9/R10 \leq 6.00$, where R9 denotes a curvature radius of an object side surface of the fifth lens, and R10 denotes a curvature radius of an image side surface of the fifth lens.

As an improvement, the camera optical lens further satisfies $-2.99 \leq (R1+R2)/(R1-R2) \leq -0.48$, and $0.04 \leq d1/TTL \leq 0.17$, where R1 denotes a curvature radius of an object side surface of the first lens, R2 denotes a curvature radius of an image side surface of the first lens, d1 denotes an on-axis thickness of the first lens, and TTL denotes a total optical length from the object side surface of the first lens to an image plane of the camera optical lens along an optic axis.

As an improvement, the camera optical lens further satisfies $-3.14 \leq f2/f \leq -0.52$, $-0.04 \leq (R3+R4)/(R3-R4) \leq 6.80$, and $0.01 \leq d3/TTL \leq 0.04$, where f2 denotes a focal length of the second lens, R3 denotes a curvature radius of an object side surface of the second lens, R4 denotes a curvature radius of the image side surface of the second lens, d3 denotes an on-axis thickness of the second lens, and TTL denotes a total optical length from an object side surface of the first lens to an image plane of the camera optical lens along an optic axis.

As an improvement, the camera optical lens further satisfies $-12.64 \leq f3/f \leq 140.61$, $-0.12 \leq (R5+R6)/(R5-R6) \leq 78.41$, and $0.02 \leq d5/TTL \leq 0.10$, where f3 denotes a focal length of the third lens, R5 denotes a curvature radius of the object side surface of the third lens, R6 denotes a curvature radius of an image side surface of the third lens, and TTL denotes a total optical length from an object side surface of the first lens to an image plane of the camera optical lens along an optic axis.

As an improvement, the camera optical lens further satisfies $0.81 \leq f4/f \leq 122.22$, $-1.83 \leq (R7+R8)/(R7-R8) \leq 50.32$, and $0.03 \leq d7/TTL \leq 0.10$, where f4 denotes a focal length of the fourth lens, R7 denotes a curvature radius of an object side surface of the fourth lens, R8 denotes a curvature radius of an image side surface of the fourth lens, d7 denotes an on-axis thickness of the fourth lens, and TTL denotes a total optical length from an object side surface of the first lens to an image plane of the camera optical lens along an optic axis.

As an improvement, the camera optical lens further satisfies $1.64 \leq f5/f \leq 6.62$, $0.72 \leq (R9+R10)/(R9-R10) \leq 7.38$, and $0.03 \leq d9/TTL \leq 0.12$, where f5 denotes a focal length of the fifth lens, R9 denotes a curvature radius of an object side surface of the fifth lens, R10 denotes a curvature radius of an image side surface of the fifth lens, d9 denotes an on-axis thickness of the fifth lens, and TTL denotes a total optical length from an object side surface of the first lens to an image plane of the camera optical lens along an optic axis.

As an improvement, the camera optical lens further satisfies $-9.44 \leq f6/f \leq -1.31$, $-2.98 \leq (R11+R12)/(R11-R12) \leq 17.35$, and $0.02 \leq d11/TTL \leq 0.31$, where R11 denotes a curvature radius of an object side surface of the sixth lens, R12 denotes a curvature radius of an image side surface of the sixth lens, d11 denotes an on-axis thickness of the sixth lens, and TTL denotes a total optical length from an object side surface of the first lens to an image plane of the camera optical lens along an optic axis.

As an improvement, the camera optical lens further satisfies $-2.60 \leq f7/f \leq -0.66$, $0.18 \leq (R13+R14)/(R13-R14) \leq 3.21$, and $0.02 \leq d13/TTL \leq 0.10$, where R13 denotes a curvature radius of an object side surface of the seventh lens, R14 denotes a curvature radius of an image side surface of the seventh lens, d13 denotes an on-axis thickness of the seventh lens, and TTL denotes a total optical length from an object side surface of the first lens to an image plane of the camera optical lens along an optic axis.

As an improvement, the camera optical lens further satisfies $f/IH \geq 2.2$, where IH denotes an image height of the camera optical lens.

The present disclosure has advantageous effects in that the camera optical lens according to the present disclosure has excellent optical characteristics and is ultra-thin, long-focal-length and has a large aperture, making it especially suitable for high-pixel camera optical lens assembly of mobile phones and WEB camera optical lenses formed by camera elements such as CCD and CMOS.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment 1

Figure 1:
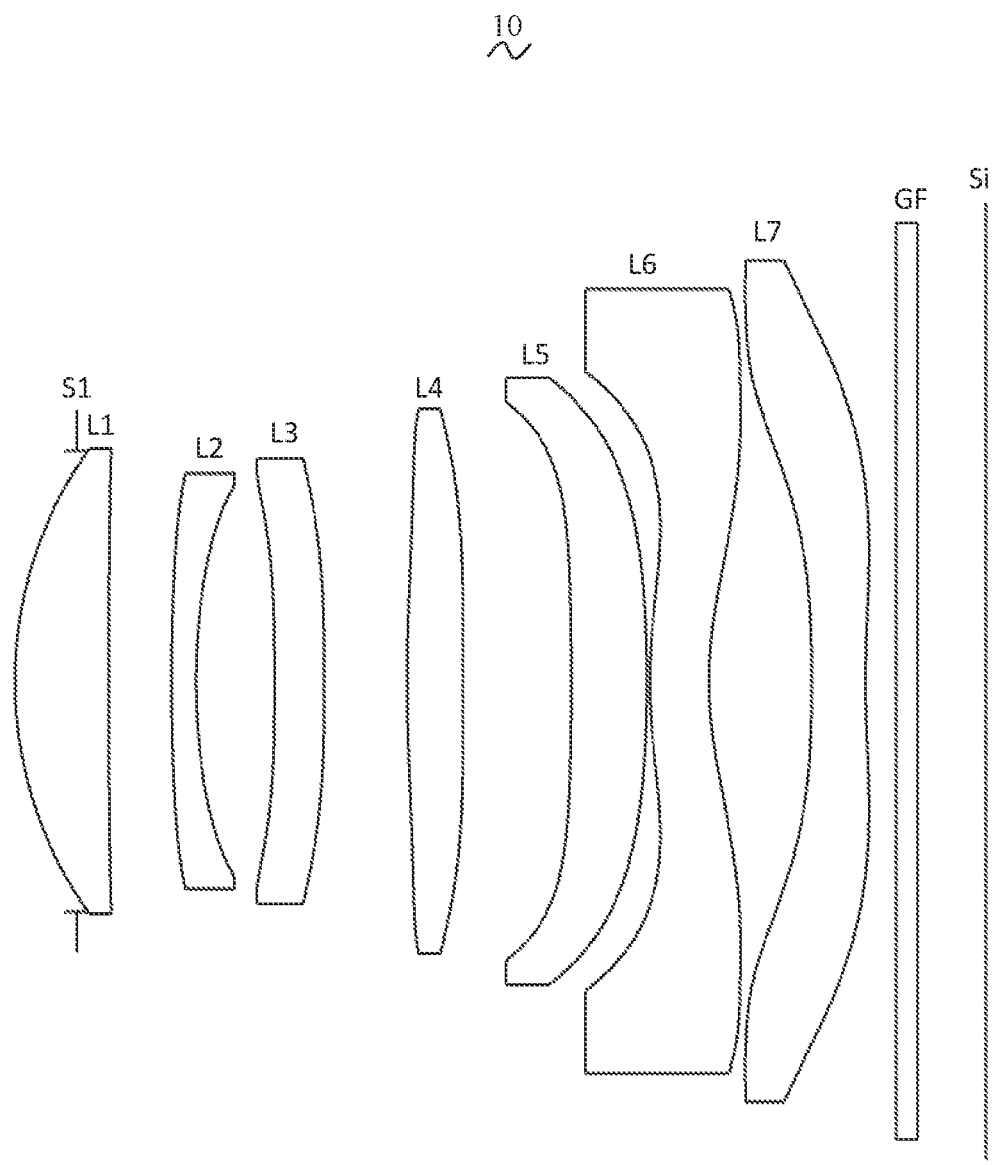
FIG. 1 is a schematic diagram of a structure of a camera optical lens in accordance with Embodiment 1 of the present disclosure.

Referring to FIG. 1, the present disclosure provides a camera optical lens 10. FIG. 1 shows the camera optical lens 10 according to Embodiment 1 of the present disclosure. The camera optical lens 10 includes seven lenses. For example, the camera optical lens 10 includes an aperture S1, a first lens L1, a second lens L2, a third lens L3, a fourth lens L4, a fifth lens L5, a sixth lens L6, and a seventh lens L7 that are sequentially arranged from an object side to an image side.

A glass filter (GF) can be arranged between the seventh lens L7 and an image plane Si, and the glass filter can be a glass plate or can be an optical filter.

In the present embodiment, the first lens L1 has a positive refractive power, the second lens L2 has a negative refractive power, the third lens L3 has a positive refractive power, the fourth lens L4 has a positive refractive power, the fifth lens L5 has a positive refractive power, the sixth lens L6 has a negative refractive power, and the seventh lens L7 has a negative refractive power.

The first lens L1 is made of a plastic material, the second lens L2 is made of a plastic material, the third lens L3 is made of a plastic material, the fourth lens L4 is made of a plastic material, the fifth lens L5 is made of a plastic material, the sixth lens L6 is made of a plastic material, and the seventh lens L7 is made of a plastic material.

A focal length of the camera optical lens 10 is defined as f, a focal length of the first lens L1 is defined as f1, a focal length of the sixth lens L6 is defined as f6, a focal length of the seventh lens L7 is defined as f7, an on-axis distance from an image side surface of the second lens L2 to an object side surface of the third lens L3 is defined as d4, and an on-axis thickness of the third lens L3 is defined as d5. The camera optical lens 10 should satisfy following conditions:

$$0.50 \leq f1/f \leq 0.80 \quad (1);$$

$$1.50 \leq f6/f7 \leq 5.00 \quad (2); \text{ and}$$

$$1.20 \leq d4/d5 \leq 2.00 \quad (3).$$

The condition (1) specifies a ratio of the focal length f1 of the first lens L1 to the focal length f of the system. This condition facilitates the improvement of an imaging performance.

The condition (2) specifies a ratio of the focal length f6 of the sixth lens L6 to the focal length f7 of the seventh lens L7. This condition facilitates to correct a field curvature of system and improve the imaging quality.

The condition (3) specifies a ratio of the on-axis distance d4 from the image side surface of the second lens L2 to the object side surface of the third lens L3 to the on-axis thickness d5 of the third lens L3. When d4/d5 satisfies such a condition, long-focal-length of the system can be achieved.

A curvature radius of the object side surface of the fifth lens L5 is defined as R9, and a curvature radius of the image side surface of the fifth lens L5 is defined as R10. The camera optical lens 10 should satisfy a condition of $1.50 \leq R9/R10 \leq 6.00$, which specifies a shape of the fifth lens L5. This condition can lower degree of refraction of light in the lens while effectively reducing aberrations.

In the present embodiment, the first lens L1 includes an object side surface being convex in a paraxial region and an image side surface being concave in the paraxial region.

A curvature radius of the object side surface of the first lens L1 is defined as R1, and a curvature radius of the image side surface of the first lens L1 is defined as R2. The camera optical lens 10 should satisfy a condition of $-2.99 \leq (R1+R2)/(R1-R2) \leq -0.48$. This can reasonably control a shape of the first lens L1, allowing the first lens L1 to effectively correct spherical aberrations of the system. As an example, $-1.87 \leq (R1+R2)/(R1-R2) \leq -0.60$.

An on-axis thickness of the first lens L1 is defined as d1, and a total optical length from the object side surface of the first lens L1 to an image plane of the camera optical lens 10 along an optic axis is defined as TTL. The camera optical lens 10 should satisfy a condition of $0.04 \leq d1/TTL \leq 0.17$.

This condition can facilitate to achieve ultra-thin lenses. As an example, $0.07 \leq d1/TTL \leq 0.13$.

The second lens L2 includes an object side surface being convex in a paraxial region and an image side surface being concave in the paraxial region.

The focal length of the camera optical lens 10 is f, and a focal length of the second lens L2 is f2. The camera optical lens 10 further satisfies a condition of $-3.14 \leq f2/f \leq -0.52$. The negative refractive power of the second lens L2 is limited within the reasonable range to facilitate the correction of aberrations of the optical system. As an example, $-1.96 \leq f2/f \leq -0.65$.

A curvature radius of the object side surface of the second lens L2 is defined as R3, and a curvature radius of the image side surface of the second lens L2 is defined as R4. The camera optical lens 10 should satisfy a condition of $-0.04 \leq (R3+R4)/(R3-R4) \leq 6.80$, which specifies a shape of the second lens L2. This condition can facilitate correction of an on-axis aberration and is conducive to the development of ultra-thin, long-focal-length lenses. As an example, $-0.03 \leq (R3+R4)/(R3-R4) \leq 5.44$.

An on-axis thickness of the second lens L2 is defined as d3, and the total optical length from the object side surface of the first lens L1 to an image plane of the camera optical lens 10 along an optic axis is defined as TTL. The camera optical lens 10 should satisfy a condition of $0.01 \leq d3/TTL \leq 0.04$, which facilitates to achieve the ultra-thin lenses. As an example, $0.02 \leq d3/TTL \leq 0.03$.

In the present embodiment, the third lens L3 includes an object side surface being concave in a paraxial region and an image side surface being convex in the paraxial region.

The focal length of the camera optical lens 10 is f, and a focal length of the third lens L3 is f3. The camera optical lens 10 further satisfies a condition of $-12.64 \leq f3/f \leq 140.61$, which appropriately distributes the refractive power, resulting in better imaging quality and a lower sensitivity. As an example, $-7.90 \leq f3/f \leq 112.49$.

A curvature radius of the object side surface of the third lens L3 is defined as R5, and a curvature radius of the image side surface of the third lens L3 is defined as R6. The camera optical lens 10 should satisfy a condition of $-0.12 \leq (R5+R6)/(R5-R6) \leq 78.41$, which specifies a shape of the third lens L3. This condition can alleviate the deflection of light passing through the lens while effectively reducing aberrations. As an example, $-0.07 \leq (R5+R6)/(R5-R6) \leq 62.73$.

An on-axis thickness of the third lens L3 is defined as d5, and the total optical length from the object side surface of the first lens L1 to an image plane of the camera optical lens 10 along an optic axis is defined as TTL. The camera optical lens 10 should satisfy a condition of $0.02 \leq d5/TTL \leq 0.10$, which facilitates to achieve the ultra-thin lenses. As an example, $0.03 \leq d5/TTL \leq 0.08$.

The fourth lens L4 includes an object side surface being convex in a paraxial region and an image side surface being convex in the paraxial region.

The focal length of the camera optical lens 10 is defined as f, and a focal length of the fourth lens L4 is defined as f4. The camera optical lens 10 should satisfy a condition of $0.81 \leq f4/f \leq 122.22$, which specifies a ratio of the focal length f4 of the fourth lens L4 and the focal length f of the system, thereby improving the optical performance of the system. As an example, $1.29 \leq f4/f \leq 97.78$.

A curvature radius of the object side surface of the fourth lens L4 is defined as R7, and a curvature radius of the image side surface of the fourth lens L4 is defined as R8. The camera optical lens 10 should satisfy a condition of $-1.83 \leq (R7+R8)/(R7-R8) \leq 50.32$, which specifies a shape of the fourth lens L4, which facilitates the correction of an off-axis aberration and is conducive to the development towards ultra-thin, long-focal-length lenses. As an example, $-1.14 \leq (R7+R8)/(R7-R8) \leq 40.26$.

An on-axis thickness of the fourth lens L4 is defined as d7, and the total optical length from the object side surface of the first lens L1 to an image plane of the camera optical lens 10 along an optic axis is defined as TTL. The camera optical lens 10 should satisfy a condition of $0.03 \leq d7/TTL \leq 0.10$, which facilitates to achieve the ultra-thin lenses. As an example, $0.05 \leq d7/TTL \leq 0.08$.

In the present embodiment, the fifth lens L5 includes an object side surface being concave in a paraxial region and an image side surface being convex in the paraxial region.

The focal length of the camera optical lens 10 is f, and a focal length of the fifth lens L5 is f5. The camera optical lens 10 further satisfies a condition of $1.64 \leq f5/f \leq 6.62$. This condition can effectively make a light angle of the camera optical lens 10 gentle and reduce the tolerance sensitivity. As an example, $2.62 \leq f5/f \leq 5.29$.

A curvature radius of the object side surface of the fifth lens L5 is defined as R9, and a curvature radius of the image side surface of the fifth lens L5 is defined as R10. The camera optical lens 10 should satisfy a condition of $0.72 \leq (R9+R10)/(R9-R10) \leq 7.38$, which specifies a shape of the fifth lens L5. This can facilitate correction of an off-axis aberration with development towards ultra-thin, long-focal-length lenses. As an example, $1.16 \leq (R9+R10)/(R9-R10) \leq 5.91$.

An on-axis thickness of the fifth lens L5 is defined as d9, and the total optical length from the object side surface of the first lens L1 to an image plane of the camera optical lens 10 along an optic axis is defined as TTL. The camera optical lens 10 should satisfy a condition of $0.03 \leq d9/TTL \leq 0.12$, which facilitates to achieve the ultra-thin lenses. As an example, $0.05 \leq d9/TTL \leq 0.09$.

The sixth lens L6 includes an object side surface being convex in a paraxial region and an image side surface being concave in the paraxial region.

The focal length of the camera optical lens 10 is f, and the focal length of the sixth lens L6 is f6. The camera optical lens 10 further satisfies a condition of $-9.44 \leq f6/f \leq -1.31$. The appropriate distribution of the refractive power leads to better imaging quality and a lower sensitivity. As an example, $-5.90 \leq f6/f \leq -1.64$.

A curvature radius of the object side surface of the sixth lens L6 is defined as R11, and a curvature radius of the image side surface of the sixth lens L6 is defined as R12. The camera optical lens 10 further satisfies a condition of $-2.98 \leq (R11+R12)/(R11-R12) \leq 17.35$, which specifies a shape of the sixth lens L6. This condition can facilitate correction of an off-axis aberration with development towards ultra-thin, long-focal-length lenses. As an example, $-1.86 \leq (R11+R12)/(R11-R12) \leq 13.88$.

An on-axis thickness of the sixth lens L6 is defined as d11, and the total optical length from the object side surface of the first lens L1 to an image plane of the camera optical lens 10 along an optic axis is defined as TTL. The camera optical lens 10 should further satisfy a condition of $0.02 \leq d11/TTL \leq 0.31$, which facilitates to achieve the ultra-thin lenses. As an example, $0.03 \leq d11/TTL \leq 0.25$.

In the present embodiment, the seventh lens L7 includes an object side surface being concave in a paraxial region and an image side surface being concave in the paraxial region.

The focal length of the camera optical lens 10 is defined as f, and the focal length of the seventh lens L7 is defined as f7. The camera optical lens 10 should further satisfy a condition of −2.60≤f7/f≤−0.66. Through appropriate distribution of the refractive power, the system has a better imaging quality and a lower sensitivity. As an example, −1.63≤f7/f≤−0.82.

A curvature radius of an object side surface of the seventh lens L7 is defined as R13, and a curvature radius of an image side surface of the seventh lens L7 is defined as R14. The camera optical lens 10 should satisfy a condition of 0.18≤ (R13+R14)/(R13−R14)≤3.21, which specifies a shape of the seventh lens L7. This can facilitate correction of an off-axis aberration with development towards ultra-thin, long-focal-length lenses. As an example, 0.28≤(R13+R14)/(R13−R14) ≤2.57.

An on-axis thickness of the seventh lens L7 is defined as d13, and the total optical length from the object side surface of the first lens L1 to an image plane of the camera optical lens 10 along an optic axis is defined as TTL. The camera optical lens 10 should satisfy a condition of 0.02≤d13/TTL≤0.10, which facilitates to achieve the ultra-thin lenses. As an example, 0.03≤d13/TTL≤0.08.

In the present embodiment, an image height of the camera optical lens 10 is defined as IH, and the focal length of the camera optical lens 10 is defined as f. The camera optical lens 10 should satisfy a condition of f/IH≥2.2, to achieve long-focal-length lenses.

In the present embodiment, an F number (FNO) of the camera optical lens 10 is smaller than or equal to 2.20. Thus, the camera optical lens 10 has a large aperture and better imaging performance.

In the present embodiment, the focal length of the camera optical lens 10 is defined as f, and the total optical length from the object side surface of the first lens L1 to an image plane of the camera optical lens 10 along an optic axis is defined as TTL. The camera optical lens 10 should satisfy a condition of TTL/f≤1.08, thereby achieving ultra-thin lenses.

In the present embodiment, the focal length of the camera optical lens 10 is defined as f, and a combined focal length of the first lens L1 and the second lens L2 is defined as f12. The camera optical lens 10 should satisfy a condition of 0.54≤f12/f≤1.90. This can eliminate aberration and distortion of the camera optical lens 10, suppress the back focal length of the camera optical lens 10, and maintain miniaturization of the camera lens system group. As an example, 0.87≤f12/f≤1.52.

When the focal length of the camera optical lens 10, the focal lengths and the curvature radius of respective lenses satisfy the above conditions, the camera optical lens 10 will have good optical performance while satisfying design requirements for ultra-thin, long-focal-length lenses having large apertures. With these characteristics, the camera optical lens 10 is suitable for high-pixel camera optical lens assembly of mobile phones and WEB camera optical lenses formed by imaging elements such as CCD and CMOS.

In the following, examples will be used to describe the camera optical lens 10 of the present disclosure. The symbols recorded in each example will be described as follows.

The focal length, on-axis distance, curvature radius, on-axis thickness, inflexion point position, and arrest point position are all in units of mm.

TTL: total optical length (the total optical length from the object side surface of the first lens L1 to the image plane of the camera optical lens along the optic axis) in mm.

F number (FNO): a ratio of an effective focal length of the camera optical lens to an entrance pupil diameter of the camera optical lens.

In an example, inflexion points and/or arrest points can be arranged on the object side surface and/or image side surface of the lens, so as to satisfy the demand for the high quality imaging. The description below can be referred to for specific implementations.

Table 1 lists the curvature radius of the object side surface and the curvature radius R of the image side surface of each of the first lens L1 to the seventh lens L7, which constitute the camera optical lens 10 in the Embodiment 1 of the present disclosure, the on-axis thickness of each lens, the distance d between adjacent lenses, refractive index nd and abbe number vd. It should be noted that R and d are both in units of millimeter (mm).

TABLE 1

|  | R | d |  |  | nd |  | vd |
|---|---|---|---|---|---|---|---|
| S1 | ∞ | d0 = | −0.600 |  |  |  |  |
| R1 | 3.155 | d1 = | 0.916 | nd1 | 1.5444 | v1 | 55.82 |
| R2 | 204.011 | d2 = | 0.616 |  |  |  |  |
| R3 | 17.523 | d3 = | 0.237 | nd2 | 1.67 | v2 | 19.39 |
| R4 | 4.865 | d4 = | 0.767 |  |  |  |  |
| R5 | −26.130 | d5 = | 0.491 | nd3 | 1.6700 | v3 | 19.39 |
| R6 | −25.149 | d6 = | 0.810 |  |  |  |  |
| R7 | 13.007 | d7 = | 0.548 | nd4 | 1.5346 | v4 | 55.70 |
| R8 | −295.204 | d8 = | 1.057 |  |  |  |  |
| R9 | −25.926 | d9 = | 0.740 | nd5 | 1.5844 | v5 | 28.22 |
| R10 | −10.362 | d10 = | 0.030 |  |  |  |  |
| R11 | 3.892 | d11 = | 0.579 | nd6 | 1.5346 | v6 | 55.70 |
| R12 | 2.930 | d12 = | 1.008 |  |  |  |  |
| R13 | −15.964 | d13 = | 0.524 | nd7 | 1.5346 | v7 | 55.70 |
| R14 | 7.684 | d14 = | 0.256 |  |  |  |  |
| R15 | ∞ | d15 = | 0.210 | ndg | 1.5168 | vg | 64.17 |
| R16 | ∞ | d16 = | 0.713 |  |  |  |  |

In the table, meanings of various symbols will be described as follows.

S1: aperture;

R: curvature radius of an optical surface, a central curvature radius for a lens;

R1: curvature radius of the object side surface of the first lens L1;

R2: curvature radius of the image side surface of the first lens L1;

R3: curvature radius of the object side surface of the second lens L2;

R4: curvature radius of the image side surface of the second lens L2;

R5: curvature radius of the object side surface of the third lens L3;

R6: curvature radius of the image side surface of the third lens L3;

R7: curvature radius of the object side surface of the fourth lens L4;

R8: curvature radius of the image side surface of the fourth lens L4;

R9: curvature radius of the object side surface of the fifth lens L5;

R10: curvature radius of the image side surface of the fifth lens L5;

R11: curvature radius of the object side surface of the sixth lens L6;

R12: curvature radius of the image side surface of the sixth lens L6;

R13: curvature radius of the object side surface of the seven lens L7;

R14: curvature radius of the image side surface of the seven lens L7;

R15: curvature radius of an object side surface of the optical filter GF;
R16: curvature radius of an image side surface of the optical filter GF;
d: on-axis thickness of a lens and an on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;
d11: on-axis thickness of the sixth lens L6;
d12: on-axis distance from the image side surface of the sixth lens L6 to the object side surface of the seventh lens L7;
d13: on-axis thickness of the seventh lens L7;
d14: on-axis distance from the image side surface of the seventh lens L7 to the object side surface of the optical filter GF;
d15: on-axis thickness of the optical filter GF;
d16: on-axis distance from the image side surface of the optical filter GF to the image plane Si;
nd: refractive index of d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
nd7: refractive index of d line of the seventh lens L7;
ndg: refractive index of d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7;
vg: abbe number of the optical filter GF.

Table 2 includes aspheric surface data of respective lens in the camera optical lens 10 according to Embodiment 1 of the present disclosure.

TABLE 2

| | Conic coefficient | Aspherical surface coefficients | | | | |
|---|---|---|---|---|---|---|
| | k | A4 | A6 | A8 | A10 | A12 |
| R1 | −4.7598E−02 | 1.5706E−04 | 1.6866E−05 | −6.8053E−05 | 5.3119E−05 | −2.3234E−05 |
| R2 | 9.0000E+01 | 1.0366E−03 | −1.0012E−04 | −4.8188E−05 | 8.0790E−05 | −4.4972E−05 |
| R3 | −4.1333E+00 | −2.1713E−03 | 2.1349E−03 | 3.2357E−04 | −3.6694E−04 | 1.3727E−04 |
| R4 | −1.5786E+00 | −3.4329E−04 | 3.0287E−03 | −1.8315E−04 | 6.0105E−04 | −6.7824E−04 |
| R5 | −9.0000E+01 | −1.6114E−02 | −4.0241E−04 | 6.1529E−04 | −8.0406E−05 | 3.5990E−06 |
| R6 | 5.9859E+01 | −1.4704E−02 | 1.9382E−04 | 5.6010E−04 | −1.2357E−04 | 1.3176E−05 |
| R7 | 2.2058E+01 | −9.5132E−03 | −2.5441E−04 | 6.4189E−04 | −1.9648E−04 | 2.7356E−05 |
| R8 | 9.0000E+01 | −9.0030E−03 | −7.6875E−04 | 8.6549E−04 | −2.6629E−04 | 4.1609E−05 |
| R9 | −9.2798E+01 | 5.1887E−03 | −9.3424E−03 | 3.1119E−03 | −6.7805E−04 | 6.7543E−05 |
| R10 | 1.0457E+01 | 7.7447E−04 | −7.7153E−03 | 3.2902E−03 | −8.7139E−04 | 1.5267E−04 |
| R11 | −3.2776E+00 | −4.0756E−02 | 4.1151E−03 | −2.9955E−04 | −9.4798E−05 | 5.8731E−05 |
| R12 | −5.3705E+00 | −1.9463E−02 | 3.9265E−03 | −1.2100E−03 | 3.1101E−04 | −5.7056E−05 |
| R13 | 8.6038E+00 | −3.6051E−02 | 9.4937E−03 | −6.9784E−04 | −3.7122E−04 | 1.2963E−04 |
| R14 | 1.6954E−01 | −4.0436E−02 | 1.0073E−02 | −1.9513E−03 | 2.2517E−04 | −1.2335E−05 |

| | Conic coefficient | Aspherical surface coefficients | | | |
|---|---|---|---|---|---|
| | k | A14 | A16 | A18 | A20 |
| R1 | −4.7598E−02 | 5.3196E−06 | −6.3001E−07 | 3.6655E−08 | −8.2962E−10 |
| R2 | 9.0000E+01 | 1.3106E−05 | −2.0225E−06 | 1.5255E−07 | −4.4062E−09 |
| R3 | −4.1333E+00 | −2.2994E−05 | 1.1246E−06 | 0.0000E+00 | 0.0000E+00 |
| R4 | −1.5786E+00 | 4.1639E−04 | −1.3963E−04 | 2.5640E−05 | −2.0491E−06 |
| R5 | −9.0000E+01 | 1.2047E−05 | −1.5413E−06 | 0.0000E+00 | 0.0000E+00 |
| R6 | 5.9859E+01 | 4.9324E−06 | −9.3669E−07 | 0.0000E+00 | 0.0000E+00 |
| R7 | 2.2058E+01 | −1.3618E−06 | 9.4514E−09 | 0.0000E+00 | 0.0000E+00 |
| R8 | 9.0000E+01 | −4.1319E−06 | 3.4465E−07 | −1.4813E−08 | 0.0000E+00 |
| R9 | −9.2798E+01 | 1.6098E−06 | −1.2008E−07 | 9.0996E−08 | 0.0000E+00 |
| R10 | 1.0457E+01 | −2.0567E−05 | 2.3124E−06 | −1.9209E−07 | 7.9470E−09 |
| R11 | −3.2776E+00 | −1.6505E−05 | 2.5630E−06 | −2.1534E−07 | 7.7487E−09 |
| R12 | −5.3705E+00 | 7.5215E−06 | −6.4594E−07 | 3.0767E−08 | −6.0344E−10 |
| R13 | 8.6038E+00 | −1.8372E−05 | 1.3484E−06 | −5.0457E−08 | 7.6237E−10 |
| R14 | 1.6954E−01 | −3.2347E−08 | 3.8168E−08 | −1.5794E−09 | 1.6920E−11 |

In Table 2, k represents a conic coefficient, and A4, A6, A8, A10, A12, A14, A16, A18 and A20 are aspheric surface coefficients.

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (4)$$

where x is a vertical distance between a point on an aspherical curve and the optic axis, and y is an aspherical depth (a vertical distance between a point on an aspherical surface, having a distance of x from the optic axis, and a surface tangent to a vertex of the aspherical surface on the optic axis).

In the present embodiment, an aspheric surface of each lens surface uses the aspheric surfaces shown in the above condition (4). However, the present disclosure is not limited to the aspherical polynomial form shown in the condition (4).

Table 3 and Table 4 show design data of inflexion points and arrest points of respective lens in the camera optical lens 10 according to Embodiment 1 of the present disclosure. P1R1 and P1R2 represent the object side surface and the image side surface of the first lens L1, respectively; P2R1 and P2R2 represent the object side surface and the image side surface of the second lens L2, respectively; P3R1 and P3R2 represent the object side surface and the image side surface of the third lens L3, respectively; P4R1 and P4R2 represent the object side surface and the image side surface of the fourth lens L4, respectively; P5R1 and P5R2 represent the object side surface and the image side surface of the fifth lens L5, respectively; P6R1 and P6R2 represent the object side surface and the image side surface of the sixth lens L6, respectively; and P7R1 and P7R2 represent the object side surface and the image side surface of the seventh lens L7, respectively. The data in the column "inflexion point position" refers to vertical distances from inflexion points arranged on each lens surface to the optic axis of the camera optical lens 10. The data in the column "arrest point position" refers to vertical distances from arrest points arranged on each lens surface to the optic axis of the camera optical lens 10.

TABLE 3

|      | Number of inflexion points | Inflexion point position 1 | Inflexion point position 2 | Inflexion point position 3 |
|------|------|------|------|------|
| P1R1 | 0 | / | / | / |
| P1R2 | 0 | / | / | / |
| P2R1 | 0 | / | / | / |
| P2R2 | 0 | / | / | / |
| P3R1 | 1 | 1.575 | / | / |
| P3R2 | 1 | 1.745 | / | / |
| P4R1 | 2 | 0.965 | 1.745 | / |
| P4R2 | 1 | 2.215 | / | / |
| P5R1 | 0 | / | / | / |
| P5R2 | 1 | 2.605 | / | / |
| P6R1 | 1 | 0.735 | / | / |
| P6R2 | 2 | 1.055 | 3.325 | / |
| P7R1 | 1 | 2.125 | / | / |
| P7R2 | 3 | 0.585 | 3.245 | 3.535 |

TABLE 4

|      | Number of arrest points | Arrest point position 1 |
|------|------|------|
| P1R1 | 0 | / |
| P1R2 | 0 | / |
| P2R1 | 0 | / |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 1 | 1.335 |
| P6R2 | 1 | 2.325 |
| P7R1 | 1 | 3.395 |
| P7R2 | 1 | 1.105 |

Figure 2:
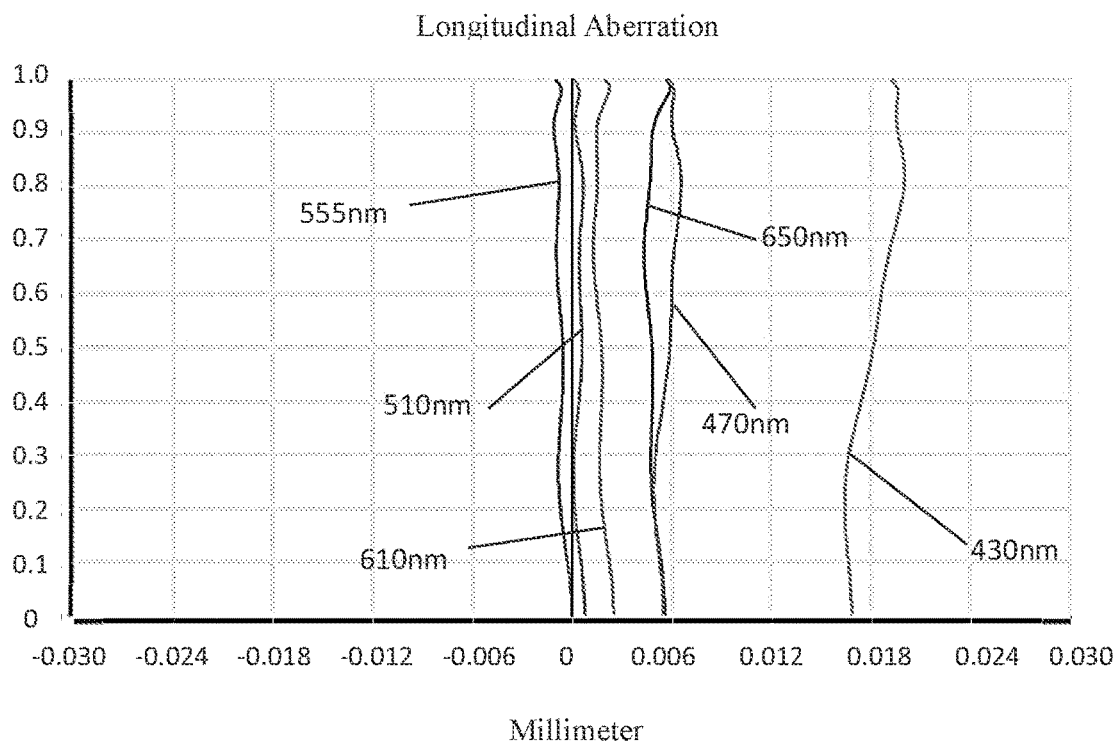
FIG. 2 is a schematic diagram of a longitudinal aberration of the camera optical lens shown in FIG. 1.
Figure 3:
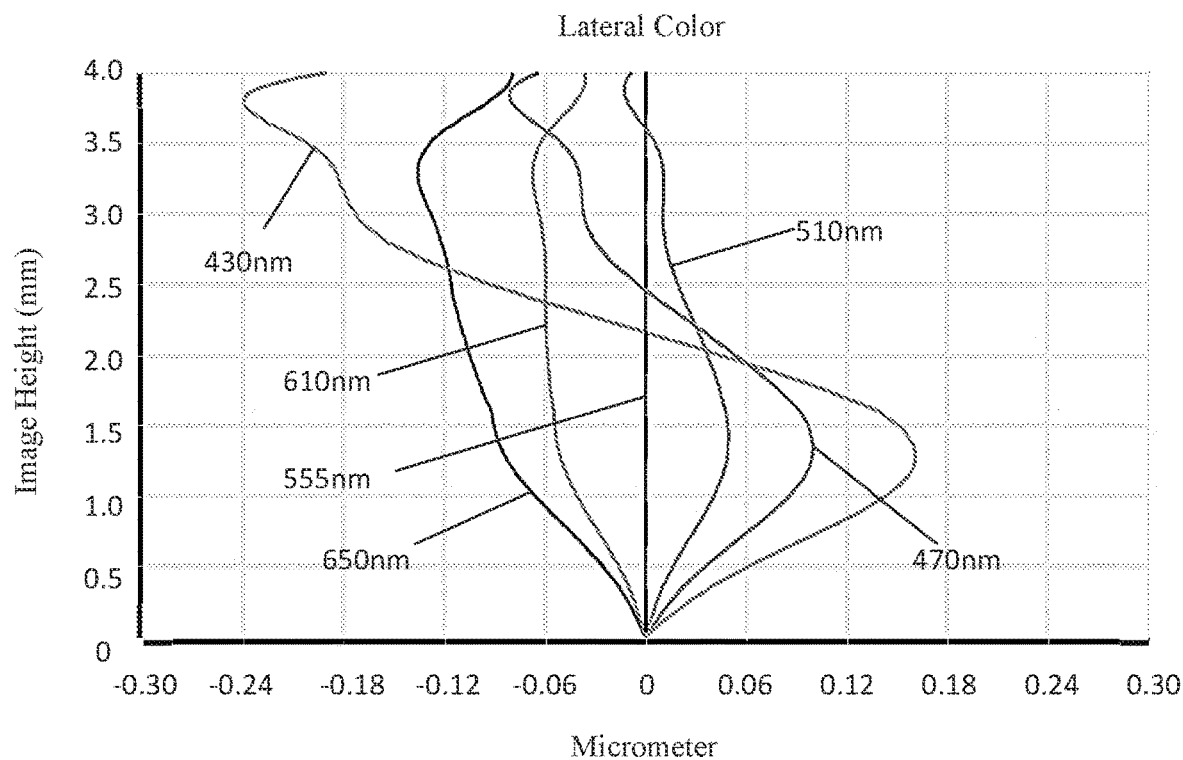
FIG. 3 is a schematic diagram of a lateral color of the camera optical lens shown in FIG. 1.
Figure 4:
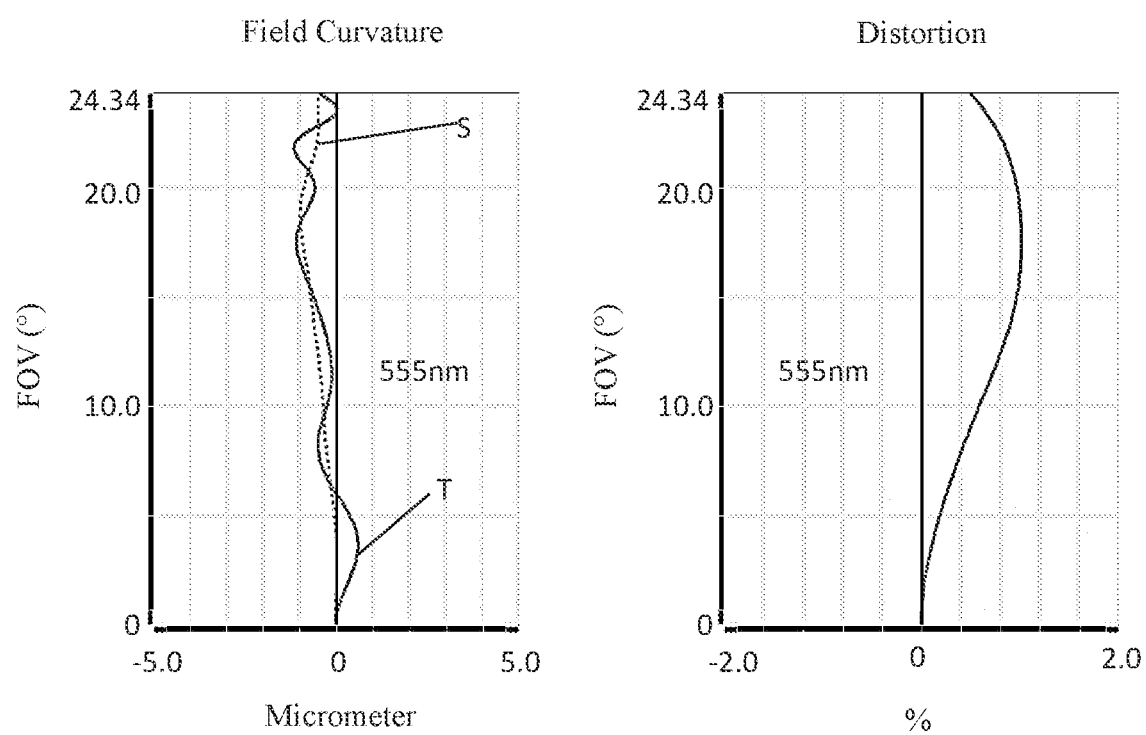
FIG. 4 is a schematic diagram of a field curvature and a distortion of the camera optical lens shown in FIG. 1.
Figure 5:
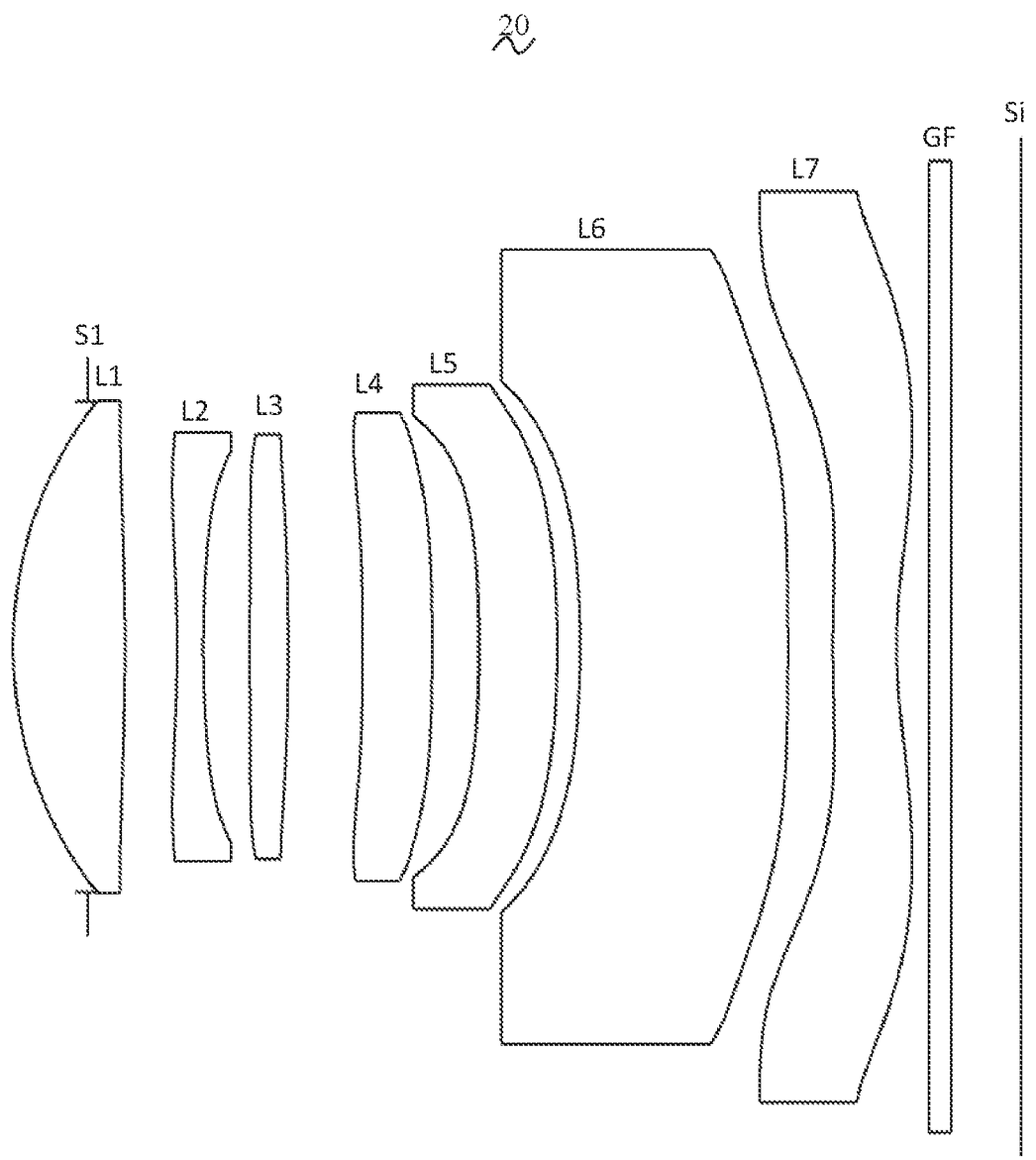
FIG. 5 is a schematic diagram of a structure of a camera optical lens in accordance with Embodiment 2 of the present disclosure.

FIG. 2 and FIG. 3 illustrate a longitudinal aberration and a lateral color of light with wavelengths of 430 nm, 470 nm, 510 nm, 555 nm, 610 nm and 650 nm after passing the camera optical lens 10 according to Embodiment 1. FIG. 4 illustrates a field curvature and a distortion of light with a wavelength of 555 nm after passing the camera optical lens 10 according to Embodiment 1, in which a field curvature S is a field curvature in a sagittal direction and T is a field curvature in a tangential direction.

The following Table 13 further lists various values of Embodiments 1, 2 and 3 and values corresponding to parameters which are specified in the above conditions.

As shown in Table 13, Embodiment 1 satisfies the respective conditions.

In the present embodiment, the entrance pupil diameter (ENPD) of the camera optical lens 10 is 4.000 mm. The image height of IH is 4.000 mm. The field of view (FOV) along a diagonal direction is 48.67°. Thus, the camera optical lens 10 can provide a large-aperture, long-focal-length, ultra-thin lens while having on-axis and off-axis aberrations sufficiently corrected, thereby leading to better optical characteristics.

Embodiment 2

Embodiment 2 is basically the same as Embodiment 1 and involves symbols having the same meanings as Embodiment 1. Only differences therebetween will be described in the following.

In the present embodiment, the image side surface of the first lens L1 is convex in the paraxial region.

In the present embodiment, the object side surface of the second lens L2 is concave in the paraxial region.

In the present embodiment, the object side surface of the third lens L3 is convex in the paraxial region.

In the present embodiment, the object side surface of the fourth lens L4 is concave in the paraxial region.

In the present embodiment, the object side surface of the sixth lens L6 is concave in the paraxial region, and the image side surface of the sixth lens L6 is convex in the paraxial region.

In the present embodiment, the object side surface of the seventh lens L7 is convex in the paraxial region.

Table 5 shows design data of a camera optical lens 20 in Embodiment 2 of the present disclosure.

TABLE 5

|    | R | d | | nd | | vd |
|----|------|------|------|------|------|------|
| S1 | ∞ | d0 = | −0.700 | | | |
| R1 | 2.918 | d1 = | 1.050 | nd1 | 1.5444 | v1 55.82 |
| R2 | −17.524 | d2 = | 0.488 | | | |
| R3 | −9.146 | d3 = | 0.243 | nd2 | 1.6700 | v2 19.39 |
| R4 | 9.558 | d4 = | 0.436 | | | |

TABLE 5-continued

| | R | d | | nd | | vd |
|---|---|---|---|---|---|---|
| R5 | 25.864 | d5 = | 0.360 | nd3 | 1.6700 | v3 | 19.39 |
| R6 | −29.070 | d6 = | 0.700 | | | |
| R7 | −27.052 | d7 = | 0.649 | nd4 | 1.5346 | v4 | 55.70 |
| R8 | −25.486 | d8 = | 0.438 | | | |
| R9 | −11.072 | d9 = | 0.734 | nd5 | 1.5844 | v5 | 28.22 |
| R10 | −7.333 | d10 = | 0.215 | | | |
| R11 | −7.284 | d11 = | 1.950 | nd6 | 1.5346 | v6 | 55.70 |
| R12 | −37.017 | d12 = | 0.418 | | | |
| R13 | 10.446 | d13 = | 0.600 | nd7 | 1.5346 | v7 | 55.70 |
| R14 | 3.792 | d14 = | 0.300 | | | |
| R15 | ∞ | d15 = | 0.210 | ndg | 1.5168 | vg | 64.17 |
| R16 | ∞ | d16 = | 0.654 | | | |

Table 6 shows aspheric surface data of respective lenses in the camera optical lens 20 according to Embodiment 2 of the present disclosure.

TABLE 6

| | Conic coefficient | Aspherical surface coefficients | | | | |
|---|---|---|---|---|---|---|
| | k | A4 | A6 | A8 | A10 | A12 |
| R1 | −1.3159E−01 | 7.1159E−04 | 4.2068E−05 | −1.3925E−05 | 7.4521E−06 | −3.4963E−06 |
| R2 | −8.6162E+01 | 3.8127E−03 | −5.3684E−04 | 1.0247E−04 | −5.3408E−06 | −6.1256E−06 |
| R3 | −8.9691E+01 | 6.1764E−04 | 7.8046E−03 | −3.3768E−03 | 1.1099E−03 | −2.6501E−04 |
| R4 | 1.7447E+01 | 2.0803E−03 | 5.0629E−04 | 6.2021E−04 | −1.7426E−04 | −5.2922E−04 |
| R5 | 8.7103E+01 | −1.6780E−02 | 2.3799E−03 | 2.8240E−03 | −1.3174E−03 | 4.1776E−04 |
| R6 | −3.3971E+00 | −1.0732E−02 | 2.0177E−04 | 2.6269E−03 | −1.2532E−03 | 3.8636E−04 |
| R7 | −9.0000E+01 | −1.8532E−02 | 2.7107E−03 | 1.8315E−03 | −8.9054E−04 | 2.7885E−04 |
| R8 | 7.2996E+01 | −2.4650E−02 | −1.0470E−03 | 5.3744E−03 | −3.4450E−03 | 1.3337E−03 |
| R9 | 2.9739E+01 | −1.3475E−02 | −1.1653E−03 | 8.4868E−03 | −3.4737E−03 | 3.2990E−04 |
| R10 | −1.2377E+00 | 2.6069E−03 | −2.2384E−02 | 1.4595E−02 | −5.3637E−03 | 9.2197E−04 |
| R11 | −3.5625E+01 | −1.2611E−02 | −1.5972E−02 | 1.0390E−02 | −3.1680E−03 | 2.4970E−04 |
| R12 | −1.0000E+02 | −9.2909E−03 | −2.1418E−03 | 1.3596E−03 | −3.9563E−04 | 6.9951E−05 |
| R13 | −4.8726E−01 | −4.6349E−02 | 7.1205E−03 | −1.3318E−04 | −2.5880E−04 | 6.9153E−05 |
| R14 | −9.0886E−01 | −4.8207E−02 | 1.0963E−02 | −2.0756E−03 | 2.9235E−04 | −3.0620E−05 |

| | Conic coefficient | Aspherical surface coefficients | | | |
|---|---|---|---|---|---|
| | k | A14 | A16 | A18 | A20 |
| R1 | −1.3159E−01 | 5.9412E−07 | −4.6334E−08 | 1.7139E−09 | −2.4462E−11 |
| R2 | −8.6162E+01 | 2.2333E−06 | −3.3636E−07 | 2.2970E−08 | −5.8104E−10 |
| R3 | −8.9691E+01 | 3.5719E−05 | −1.9867E−06 | 0.0000E+00 | 0.0000E+00 |
| R4 | 1.7447E+01 | 6.1039E−04 | −2.8339E−04 | 6.3475E−05 | −5.6956E−06 |
| R5 | 8.7103E+01 | −7.3302E−05 | 4.6607E−06 | 0.0000E+00 | 0.0000E+00 |
| R6 | −3.3971E+00 | −6.4121E−05 | 3.5663E−06 | 0.0000E+00 | 0.0000E+00 |
| R7 | −9.0000E+01 | −4.4284E−05 | 2.6911E−06 | 0.0000E+00 | 0.0000E+00 |
| R8 | 7.2996E+01 | −3.3948E−04 | 5.2394E−05 | −3.7998E−06 | 0.0000E+00 |
| R9 | 2.9739E+01 | 2.0458E−04 | −7.9491E−05 | 9.0927E−06 | 0.0000E+00 |
| R10 | −1.2377E+00 | −3.2634E−06 | −2.3553E−05 | 3.0981E−06 | −9.6555E−08 |
| R11 | −3.5625E+01 | 1.1470E−04 | −3.4642E−05 | 3.6085E−06 | −1.3102E−07 |
| R12 | −1.0000E+02 | −7.2886E−06 | 4.3168E−07 | −1.3488E−08 | 1.7340E−10 |
| R13 | −4.8726E−01 | −8.6218E−06 | 5.8374E−07 | −2.0794E−08 | 3.0686E−10 |
| R14 | −9.0886E−01 | 2.3599E−06 | −1.2694E−07 | 4.2404E−09 | −6.5351E−11 |

Table 7 and Table 8 show design data of inflexion points and arrest points of respective lens in the camera optical lens 20 according to Embodiment 2 of the present disclosure.

TABLE 7

| | Number of inflexion points | Inflexion point position 1 | Inflexion point position 2 | Inflexion point position 3 |
|---|---|---|---|---|
| P1R1 | 0 | / | / | / |
| P1R2 | 1 | 1.065 | / | / |
| P2R1 | 1 | 0.755 | / | / |
| P2R2 | 0 | / | / | / |
| P3R1 | 2 | 0.485 | 1.005 | / |
| P3R2 | 1 | 1.265 | / | / |
| P4R1 | 1 | 1.285 | / | / |
| P4R2 | 0 | / | / | / |
| P5R1 | 0 | / | / | / |
| P5R2 | 1 | 1.995 | / | / |
| P6R1 | 0 | / | / | / |
| P6R2 | 0 | / | / | / |
| P7R1 | 3 | 0.435 | 2.355 | 3.425 |
| P7R2 | 3 | 0.815 | 3.255 | 3.685 |

TABLE 8

| | Number of arrest points | Arrest point position 1 |
|---|---|---|
| P1R1 | 0 | / |
| P1R2 | 0 | / |
| P2R1 | 1 | 1.305 |
| P2R2 | 0 | / |
| P3R1 | 0 | / |
| P3R2 | 0 | / |
| P4R1 | 1 | 1.675 |
| P4R2 | 0 | / |
| P5R1 | 0 | / |
| P5R2 | 0 | / |
| P6R1 | 0 | / |

TABLE 8-continued

| | Number of arrest points | Arrest point position 1 |
|---|---|---|
| P6R2 | 0 | / |
| P7R1 | 1 | 0.775 |
| P7R2 | 1 | 1.725 |

Figure 6:
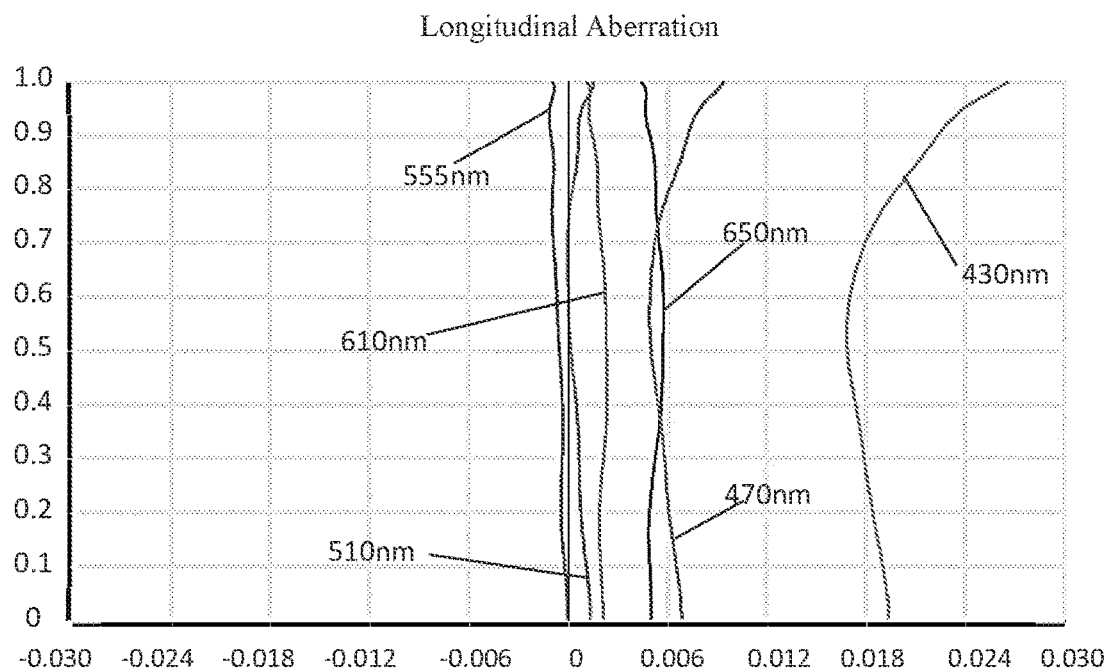
FIG. 6 is a schematic diagram of a longitudinal aberration of the camera optical lens shown in FIG. 5.
Figure 7:
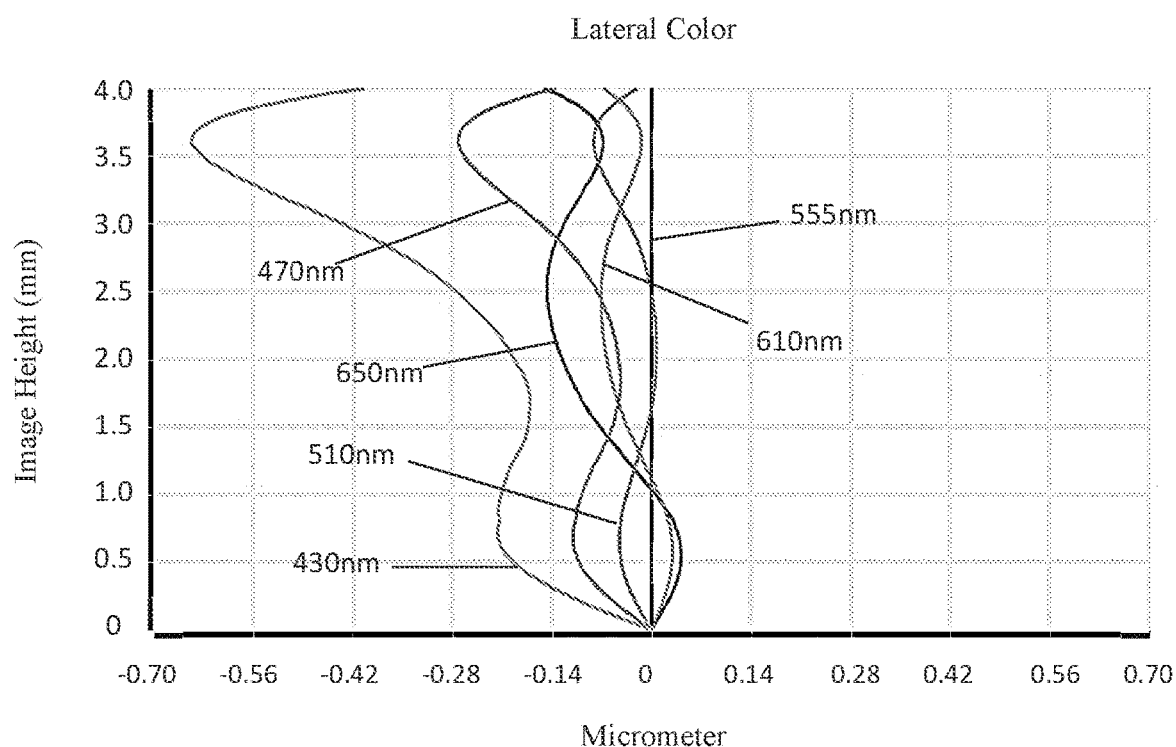
FIG. 7 is a schematic diagram of a lateral color of the camera optical lens shown in FIG. 5.
Figure 8:
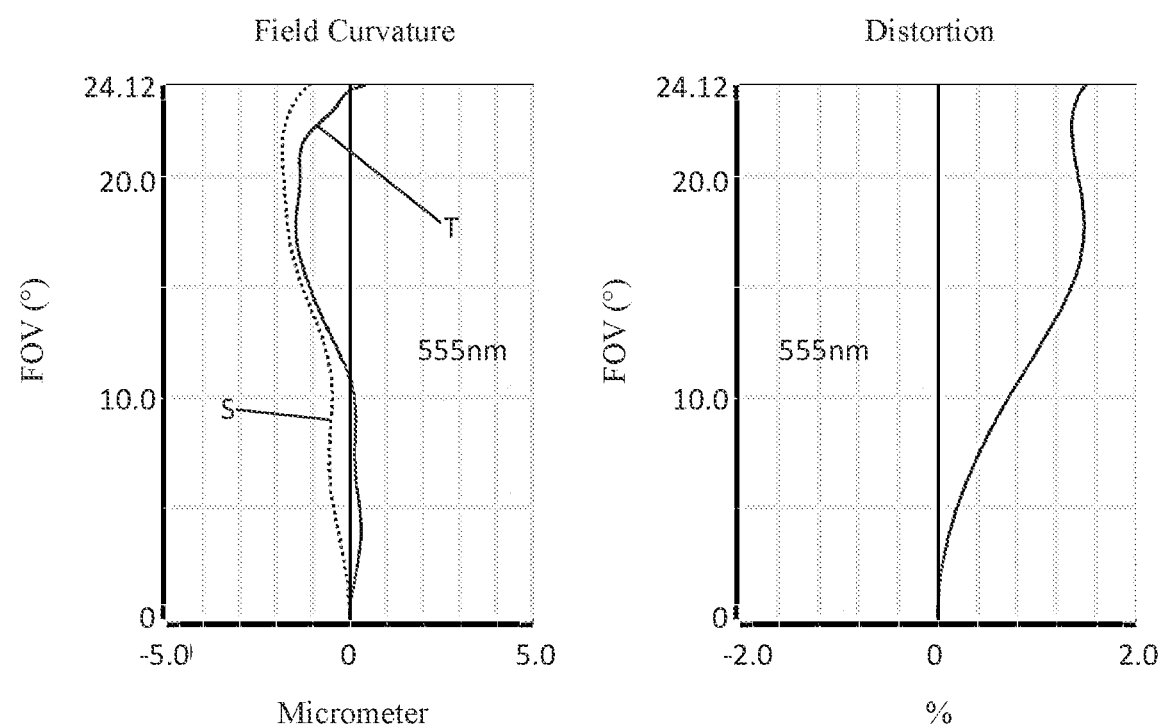
FIG. 8 is a schematic diagram of a field curvature and a distortion of the camera optical lens shown in FIG. 5.
Figure 9:
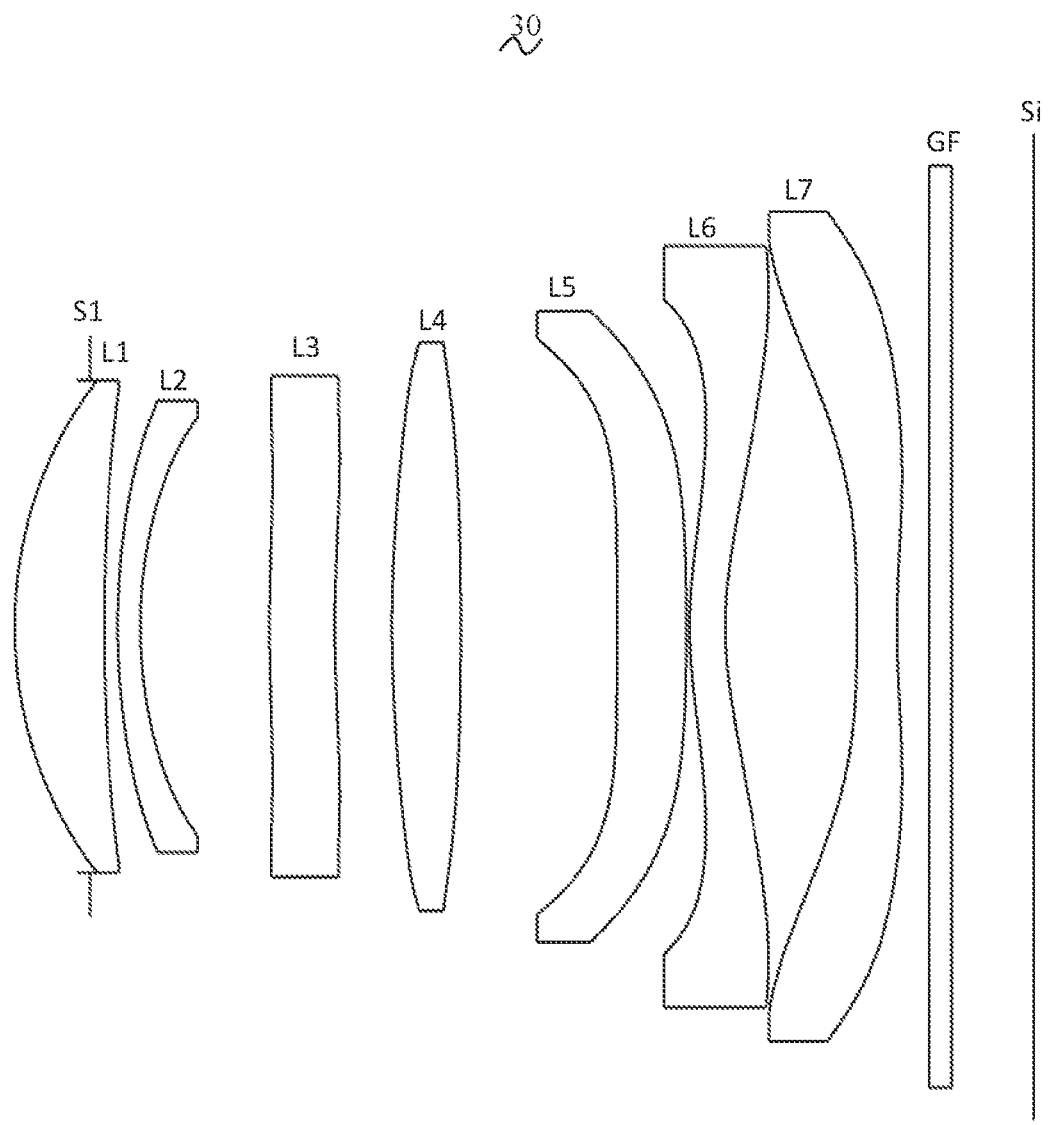
FIG. 9 is a schematic diagram of a structure of a camera optical lens in accordance with Embodiment 3 of the present disclosure.

FIG. 6 and FIG. 7 illustrate a longitudinal aberration and a lateral color of light with wavelengths of 430 nm, 470 nm, 510 nm, 555 nm, 610 nm and 650 nm after passing the camera optical lens 20 according to Embodiment 2. FIG. 8 illustrates a field curvature and a distortion of light with a wavelength of 555 nm after passing the camera optical lens 20 according to Embodiment 2.

As shown in Table 13, Embodiment 2 satisfies the respective conditions.

In the present embodiment, the entrance pupil diameter (ENPD) of the camera optical lens 20 is 4.000 mm. The image height of IH is 4.000 mm. The FOV along a diagonal direction is 48.25°. Thus, the camera optical lens 20 can provide a large-aperture, long-focal-length, ultra-thin lens while having on-axis and off-axis aberrations sufficiently corrected, thereby leading to better optical characteristics.

Embodiment 3

Embodiment 3 is basically the same as Embodiment 1 and involves symbols having the same meanings as Embodiment 1. Only differences therebetween will be described in the following.

In the present embodiment, the object side surface of the third lens L3 is convex in the paraxial position, and the image side surface of the third lens L3 is concave in the paraxial position.

The third lens L3 has a negative refractive power.

Table 9 shows design data of a camera optical lens 30 in Embodiment 3 of the present disclosure.

TABLE 9

| | R | d | | nd | | vd |
|---|---|---|---|---|---|---|
| S1 | ∞ | d0 = | −0.700 | | | |
| R1 | 2.998 | d1 = | 0.832 | nd1 | 1.5444 | v1 55.82 |
| R2 | 15.074 | d2 = | 0.129 | | | |
| R3 | 5.046 | d3 = | 0.210 | nd2 | 1.6700 | v2 19.39 |
| R4 | 3.223 | d4 = | 1.205 | | | |
| R5 | 12.602 | d5 = | 0.605 | nd3 | 1.6700 | v3 19.39 |
| R6 | 9.256 | d6 = | 0.536 | | | |
| R7 | 9.261 | d7 = | 0.638 | nd4 | 1.5346 | v4 55.70 |
| R8 | −41.518 | d8 = | 1.457 | | | |
| R9 | −103.044 | d9 = | 0.649 | nd5 | 1.5844 | v5 28.22 |
| R10 | −18.735 | d10 = | 0.030 | | | |
| R11 | 3.286 | d11 = | 0.330 | nd6 | 1.5346 | v6 55.70 |
| R12 | 2.763 | d12 = | 1.227 | | | |
| R13 | −19.709 | d13 = | 0.376 | nd7 | 1.5346 | v7 55.70 |
| R14 | 6.108 | d14 = | 0.300 | | | |
| R15 | ∞ | d15 = | 0.210 | ndg | 1.5168 | vg 64.17 |
| R16 | ∞ | d16 = | 0.767 | | | |

Table 10 shows aspheric surface data of respective lenses in the camera optical lens 30 according to Embodiment 3 of the present disclosure.

TABLE 10

| | Conic coefficient | Aspherical surface coefficients | | | | |
|---|---|---|---|---|---|---|
| | k | A4 | A6 | A8 | A10 | A12 |
| R1 | 1.3247E−03 | 4.9032E−04 | −9.4029E−05 | −2.9061E−05 | 3.7445E−05 | −1.9492E−05 |
| R2 | −2.7573E+01 | 1.8982E−03 | 1.6229E−03 | −1.3162E−03 | 5.0211E−04 | −1.2988E−04 |
| R3 | −5.7798E+00 | −4.5849E−03 | 9.8139E−03 | −4.2783E−03 | 1.1752E−03 | −1.8684E−04 |
| R4 | −1.4705E+00 | −5.3115E−03 | 1.1188E−02 | −4.6490E−03 | 2.3304E−03 | −1.2694E−03 |
| R5 | −2.4441E+01 | −1.5939E−02 | 2.0350E−03 | −2.2153E−04 | 4.5002E−05 | −1.3804E−05 |
| R6 | −3.4996E+01 | −1.5964E−02 | 2.2654E−03 | −1.3206E−04 | −8.0719E−05 | 2.8077E−05 |
| R7 | 1.2320E+01 | −1.0441E−02 | 1.5259E−03 | 2.3703E−04 | −1.7845E−04 | 1.9599E−05 |
| R8 | 9.0000E+01 | −6.9378E−03 | 6.7513E−04 | 4.0602E−04 | −1.7424E−04 | 2.6647E−05 |
| R9 | 9.9000E+01 | −2.4011E−03 | −1.1578E−02 | 4.2570E−03 | −1.2745E−03 | 2.7942E−04 |
| R10 | 2.7451E+01 | −7.6306E−03 | −7.0958E−03 | 2.9082E−03 | −6.7685E−04 | 8.1843E−05 |
| R11 | −3.5249E+00 | −5.5403E−02 | 1.6235E−02 | −3.1037E−03 | 3.0547E−04 | −1.1180E−05 |
| R12 | −4.7470E+00 | −3.7479E−02 | 1.4227E−02 | −3.3261E−03 | 4.7003E−04 | −3.9524E−05 |
| R13 | 1.9264E+01 | −4.9128E−02 | 1.4852E−02 | −2.6004E−03 | 2.0180E−04 | 1.8886E−05 |
| R14 | −5.0163E−01 | −5.0481E−02 | 1.5934E−02 | −3.9620E−03 | 7.1432E−04 | −9.3737E−05 |

| | Conic coefficient | Aspherical surface coefficients | | | |
|---|---|---|---|---|---|
| | k | A14 | A16 | A18 | A20 |
| R1 | 1.3247E−03 | 4.1458E−06 | −4.1761E−07 | 2.0082E−08 | −3.7269E−10 |
| R2 | −2.7573E+01 | 2.4477E−05 | −3.0647E−06 | 2.1240E−07 | −5.9726E−09 |
| R3 | −5.7798E+00 | 1.7400E−05 | −9.7964E−07 | 0.0000E+00 | 0.0000E+00 |
| R4 | −1.4705E+00 | 6.0768E−04 | −1.9038E−04 | 3.3684E−05 | −2.5683E−06 |
| R5 | −2.4441E+01 | 9.2325E−06 | −1.1673E−06 | 0.0000E+00 | 0.0000E+00 |
| R6 | −3.4996E+01 | 1.8983E−07 | −3.4432E−07 | 0.0000E+00 | 0.0000E+00 |
| R7 | 1.2320E+01 | 2.4864E−06 | −4.0174E−07 | 0.0000E+00 | 0.0000E+00 |
| R8 | 9.0000E+01 | −4.0269E−06 | 8.1851E−07 | −6.5212E−08 | 0.0000E+00 |
| R9 | 9.9000E+01 | −4.1888E−05 | 3.4788E−06 | −1.0366E−07 | 0.0000E+00 |
| R10 | 2.7451E+01 | −1.8878E−06 | −7.8003E−07 | 9.0322E−08 | −2.7654E−09 |
| R11 | −3.5249E+00 | −1.2522E−06 | 2.9598E−07 | −3.4197E−08 | 1.6055E−09 |
| R12 | −4.7470E+00 | 1.7261E−06 | −1.5429E−08 | −1.4957E−09 | 4.0140E−11 |
| R13 | 1.9264E+01 | −6.0689E−06 | 5.9143E−07 | −2.6647E−08 | 4.6725E−10 |
| R14 | −5.0163E−01 | 8.6949E−06 | −5.3656E−07 | 1.9545E−08 | −3.1331E−10 |

Table 11 and Table 12 show design data of inflexion points and arrest points of respective lens in the camera optical lens 30 according to Embodiment 3 of the present disclosure.

TABLE 11

|  | Number of inflexion points | Inflexion point position 1 | Inflexion point position 2 |
| --- | --- | --- | --- |
| P1R1 | 0 | / | / |
| P1R2 | 0 | / | / |
| P2R1 | 0 | / | / |
| P2R2 | 0 | / | / |
| P3R1 | 2 | 0.665 | 1.605 |
| P3R2 | 2 | 0.725 | 1.715 |
| P4R1 | 0 | / | / |
| P4R2 | 1 | 2.105 | / |
| P5R1 | 0 | / | / |
| P5R2 | 1 | 2.535 | / |
| P6R1 | 1 | 0.765 | / |
| P6R2 | 1 | 1.165 | / |
| P7R1 | 1 | 2.175 | / |
| P7R2 | 2 | 0.605 | 3.335 |

TABLE 12

|  | Number of arrest points | Arrest point position 1 | Arrest point position 2 |
| --- | --- | --- | --- |
| P1R1 | 0 | / | / |
| P1R2 | 0 | / | / |
| P2R1 | 0 | / | / |
| P2R2 | 0 | / | / |
| P3R1 | 2 | 1.225 | 1.815 |
| P3R2 | 2 | 1.375 | 1.915 |
| P4R1 | 0 | / | / |
| P4R2 | 0 | / | / |
| P5R1 | 0 | / | / |
| P5R2 | 0 | / | / |
| P6R1 | 1 | 1.645 | / |
| P6R2 | 1 | 2.725 | / |
| P7R1 | 0 | / | / |
| P7R2 | 1 | 1.225 | / |

Figure 10:
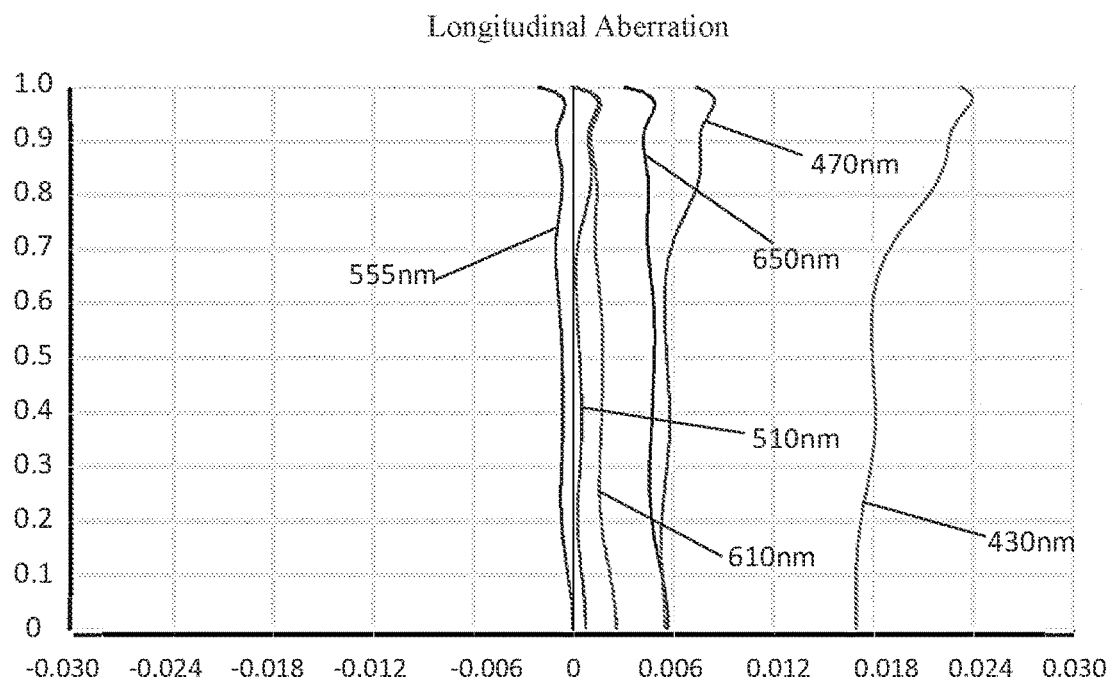
FIG. 10 is a schematic diagram of a longitudinal aberration of the camera optical lens shown in FIG. 9.
Figure 11:
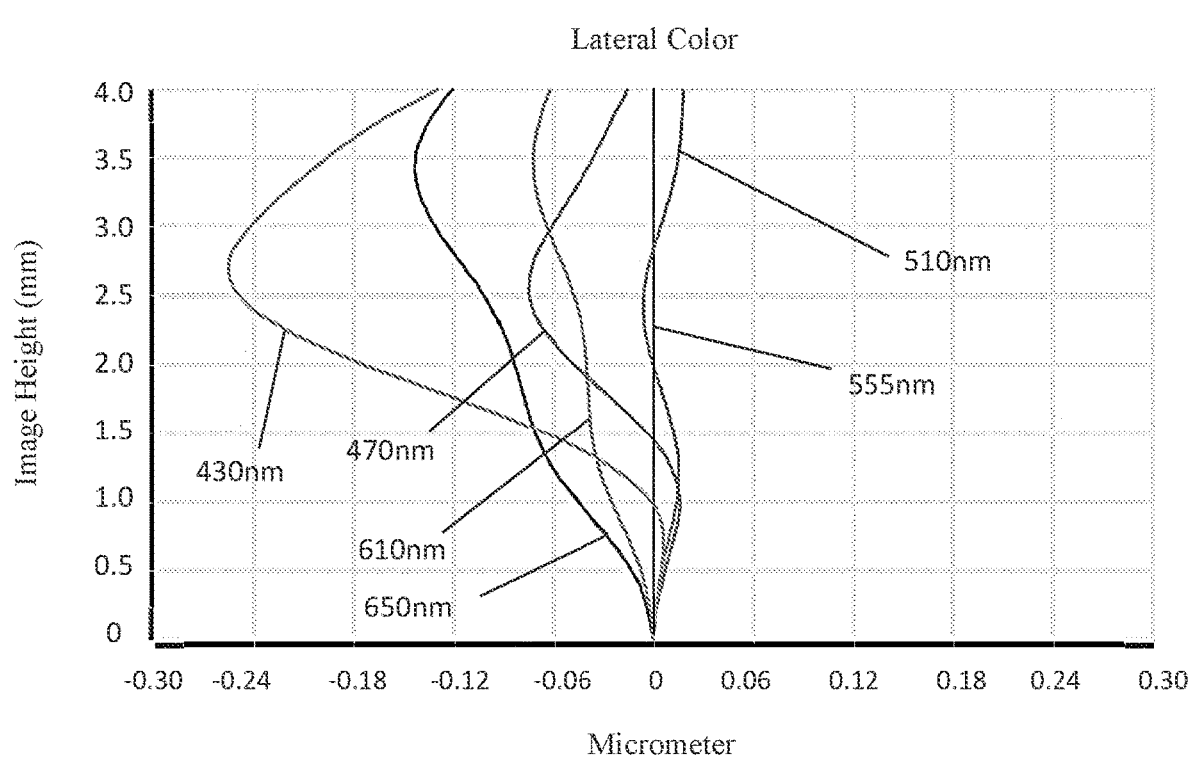
FIG. 11 is a schematic diagram of a lateral color of the camera optical lens shown in FIG. 9.
Figure 12:
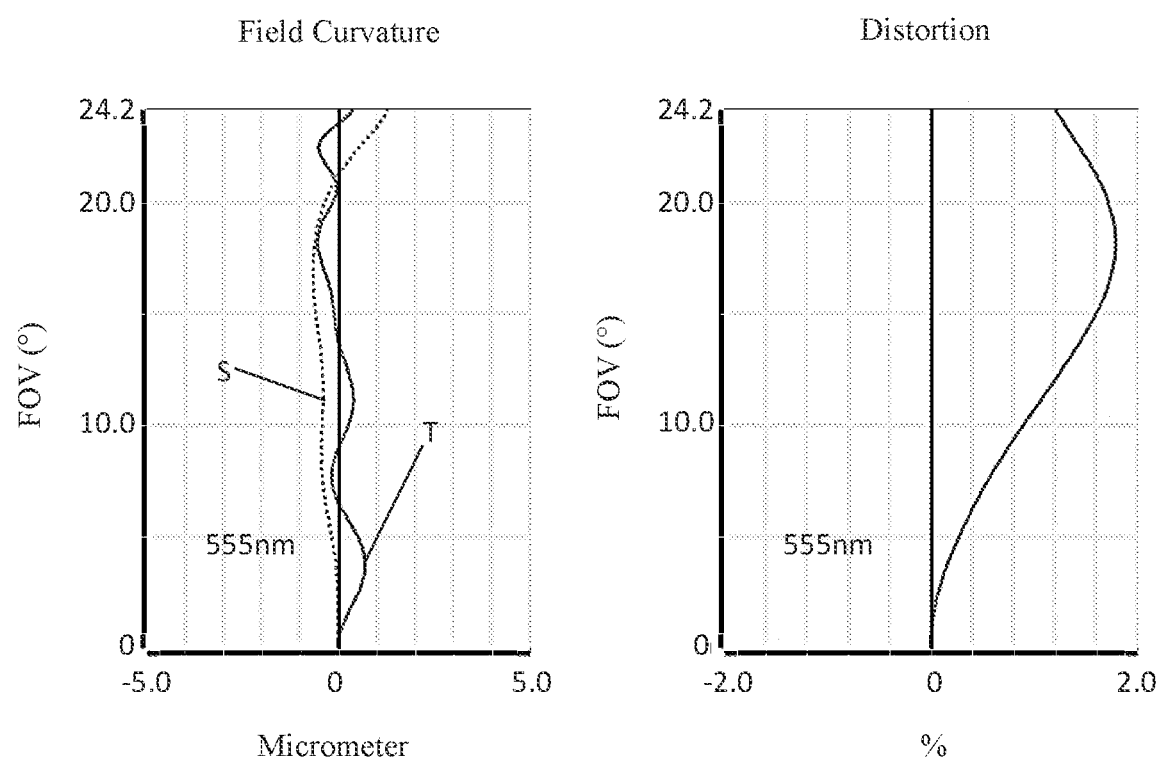
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 430 nm, 470 nm, 510 nm, 555 nm, 610 nm and 650 nm after passing the camera optical lens 30 according to Embodiment 3. FIG. 12 illustrates field curvature and distortion of light with a wavelength of 555 nm after passing the camera optical lens 30 according to Embodiment 3.

The following Table 13 further lists various values of the present embodiment and values corresponding to parameters which are specified in the above conditions. The camera optical lens according to the present embodiment satisfies the above conditions.

In the present embodiment, the entrance pupil diameter (ENPD) of the camera optical lens 30 is 4.000 mm. The image height of IH is 4.000 mm. The FOV along a diagonal direction is 48.37°. Thus, the camera optical lens 30 can provide a large-aperture, long-focal-length, ultra-thin lens while having on-axis and off-axis aberrations sufficiently corrected, thereby leading to better optical characteristics.

TABLE 13

| Parameters and Conditions | Embodiment 1 | Embodiment 2 | Embodiment 3 |
| --- | --- | --- | --- |
| f | 8.800 | 8.800 | 8.800 |
| f1 | 5.857 | 4.664 | 6.688 |
| f2 | −10.035 | −6.876 | −13.831 |
| f3 | 824.907 | 20.294 | −55.612 |
| f4 | 23.242 | 717.032 | 14.179 |
| f5 | 28.839 | 34.413 | 33.824 |
| f6 | −27.969 | −17.303 | −41.517 |
| f7 | −9.597 | −11.459 | −8.649 |
| f12 | 10.511 | 9.535 | 11.157 |
| FNO | 2.20 | 2.20 | 2.20 |
| f1/f | 0.67 | 0.53 | 0.76 |
| f6/f7 | 2.91 | 1.51 | 4.80 |
| d4/d5 | 1.56 | 1.21 | 1.99 |
| TTL | 9.502 | 9.445 | 9.501 |
| FOV | 48.67° | 48.25° | 48.37° |
| IH | 4.000 | 4.000 | 4.000 |

It can be appreciated by one having ordinary skill in the art that the description above is only embodiments of the present disclosure. In practice, one having ordinary skill in the art can make various modifications to these embodiments in forms and details without departing from the spirit and scope of the present disclosure.

What is claimed is:

1. A camera optical lens, comprising, from an object side to an image side:
    a first lens having a positive refractive power;
    a second lens having a negative refractive power;
    a third lens;
    a fourth lens having a positive refractive power;
    a fifth lens having a positive refractive power;
    a sixth lens having a negative refractive power; and
    a seventh lens having a negative refractive power,
    wherein the camera optical lens satisfies following conditions:
    $0.50 \leq f1/f \leq 0.80$;
    $1.50 \leq f6/f7 \leq 5.00$;
    $1.50 \leq R9/R10 \leq 6.00$; and
    $1.20 \leq d4/d5 \leq 2.00$,
    where
    f denotes a focal length of the camera optical lens;
    f1 denotes a focal length of the first lens;
    f6 denotes a focal length of the sixth lens;
    f7 denotes a focal length of the seventh lens;
    R9 denotes a curvature radius of an object side surface of the fifth lens;
    R10 denotes a curvature radius of an image side surface of the fifth lens;
    d4 denotes an on-axis distance from an image side surface of the second lens to an object side surface of the third lens; and
    d5 denotes an on-axis thickness of the third lens.

2. The camera optical lens as described in claim 1, further satisfying following conditions:
    $-2.99 \leq (R1+R2)/(R1-R2) \leq -0.48$; and
    $0.04 \leq d1/TTL \leq 0.17$,
    where
    R1 denotes a curvature radius of an object side surface of the first lens;
    R2 denotes a curvature radius of an image side surface of the first lens;
    d1 denotes an on-axis thickness of the first lens; and
    TTL denotes a total optical length from the object side surface of the first lens to an image plane of the camera optical lens along an optic axis.

3. The camera optical lens as described in claim 1, further satisfying following conditions:
- $-3.14 \leq f2/f \leq -0.52$;
- $-0.04 \leq (R3+R4)/(R3-R4) \leq 6.80$; and
- $0.01 \leq d3/TTL \leq 0.04$, where f2 denotes a focal length of the second lens;

R3 denotes a curvature radius of an object side surface of the second lens;

R4 denotes a curvature radius of the image side surface of the second lens;

d3 denotes an on-axis thickness of the second lens; and

TTL denotes a total optical length from an object side surface of the first lens to an image plane of the camera optical lens along an optic axis.

4. The camera optical lens as described in claim 1, further satisfying following conditions:
- $-12.64 \leq f3/f \leq 140.61$;
- $-0.12 \leq (R5+R6)/(R5-R6) \leq 78.41$; and
- $0.02 \leq d5/TTL \leq 0.10$, where f3 denotes a focal length of the third lens;

R5 denotes a curvature radius of the object side surface of the third lens;

R6 denotes a curvature radius of an image side surface of the third lens; and

TTL denotes a total optical length from an object side surface of the first lens to an image plane of the camera optical lens along an optic axis.

5. The camera optical lens as described in claim 1, further satisfying following conditions:
- $0.81 \leq f4/f \leq 122.22$;
- $\leq 1.83 \leq (R7+R8)/(R7 \leq R8) \leq 50.32$; and
- $0.03 \leq d7/TTL \leq 0.10$, where f4 denotes a focal length of the fourth lens;

R7 denotes a curvature radius of an object side surface of the fourth lens;

R8 denotes a curvature radius of an image side surface of the fourth lens;

d7 denotes an on-axis thickness of the fourth lens; and

TTL denotes a total optical length from an object side surface of the first lens to an image plane of the camera optical lens along an optic axis.

6. The camera optical lens as described in claim 1, further satisfying following conditions:
- $1.64 \leq f5/f \leq 6.62$;
- $0.72 \leq (R9+R10)/(R9-R10) \leq 7.38$; and
- $0.03 \leq d9/TTL \leq 0.12$, where f5 denotes a focal length of the fifth lens;

R9 denotes a curvature radius of an object side surface of the fifth lens;

R10 denotes a curvature radius of an image side surface of the fifth lens;

d9 denotes an on-axis thickness of the fifth lens; and

TTL denotes a total optical length from an object side surface of the first lens to an image plane of the camera optical lens along an optic axis.

7. The camera optical lens as described in claim 1, further satisfying following conditions:
- $-9.44 \leq f6/f \leq -1.31$;
- $-2.98 \leq (R11+R12)/(R11-R12) \leq 17.35$; and
- $0.02 \leq d11/TTL \leq 0.31$, where R11 denotes a curvature radius of an object side surface of the sixth lens;

R12 denotes a curvature radius of an image side surface of the sixth lens;

d11 denotes an on-axis thickness of the sixth lens; and

TTL denotes a total optical length from an object side surface of the first lens to an image plane of the camera optical lens along an optic axis.

8. The camera optical lens as described in claim 1, further satisfying following conditions:
- $-2.60 \leq f7/f \leq -0.66$;
- $0.18 \leq (R13+R14)/(R13-R14) \leq -3.21$; and
- $0.02 \leq d13/TTL \leq 0.10$, where R13 denotes a curvature radius of an object side surface of the seventh lens;

R14 denotes a curvature radius of an image side surface of the seventh lens;

d13 denotes an on-axis thickness of the seventh lens; and

TTL denotes a total optical length from an object side surface of the first lens to an image plane of the camera optical lens along an optic axis.

9. The camera optical lens as described in claim 1, further satisfying a following condition:

$f/IH \geq 2.2$, where

IH denotes an image height of the camera optical lens.

* * * * *